Figure 4:
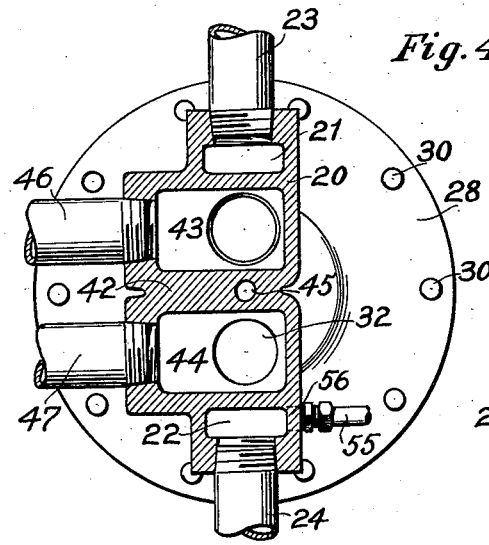

Oct. 22, 1940.　　　　　G. STUMPF　　　　　2,218,861
FOUR-WAY VALVE
Filed Sept. 8, 1939　　　　2 Sheets-Sheet 1
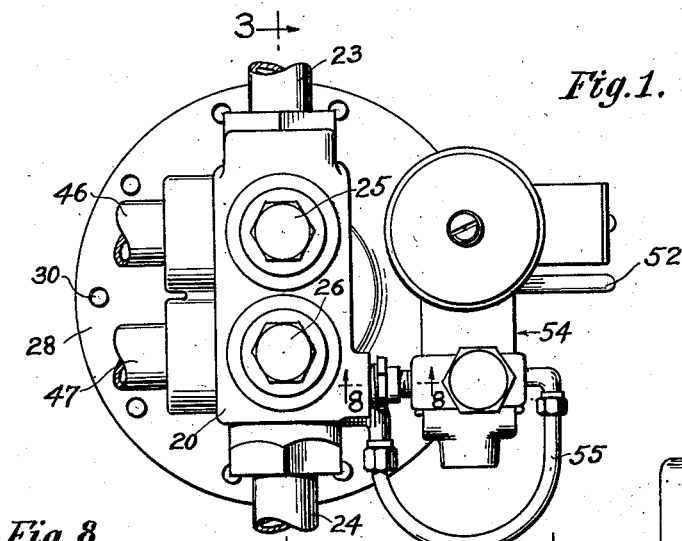
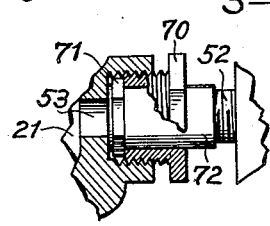
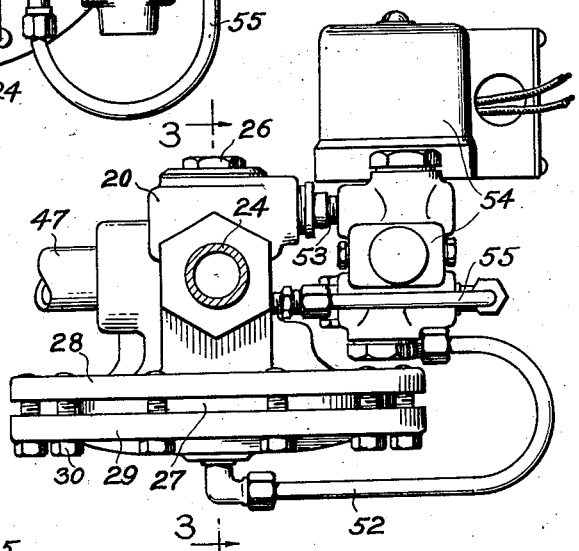
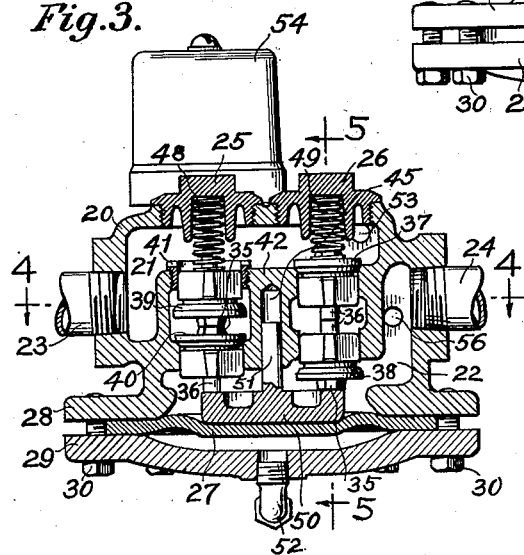
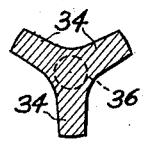
INVENTOR.
George Stumpf.
BY
ATTORNEYS.

Oct. 22, 1940.　　　　G. STUMPF　　　　2,218,861
FOUR-WAY VALVE
Filed Sept. 8, 1939　　　2 Sheets-Sheet 2

INVENTOR.
George Stumpf.
BY
Gluck + Breitenfeld
ATTORNEYS.

Patented Oct. 22, 1940

2,218,861

UNITED STATES PATENT OFFICE 2,218,861

FOUR-WAY VALVE

George Stumpf, New York, N. Y., assignor to Automatic Switch Co., New York, N. Y.

Application September 8, 1939, Serial No. 293,897

8 Claims. (Cl. 137—144)

My present invention relates generally to valves and has particular reference to an improved type of four-way valve.

Before describing the features of the present invention I will point out that one of the common general purposes of a four-way valve is to actuate a hydraulic or pneumatic cylinder, which in turn controls the operation of some member or thing which is to be reciprocated, e. g., a gate valve, a molding press, a clamp, or the like.

One of the objects of the present invention is to provide a four-way valve in which the necessity for stuffing boxes, such as those which are needed in ordinary four-way poppet valves or four-way rotating-disc valves, is dispensed with.

Another object of my invention is to provide a four-way valve in which any tendency to leak or become clogged,—as is the case with the ordinary four-way piston type valve—is eliminated. The present improved valve may be used with either a liquid or gaseous medium without leakage or becoming clogged even after prolonged periods of use or disuse.

A further object of my invention is to provide a four-way valve which is capable of operation by means of a light-weight solenoid requiring only a small amount of electrical power, as distinguished from the relatively large and heavy solenoids requiring large amounts of electrical power which must be used, where solenoid operation of existing four-way valves is desired.

Other general objects of the present invention lie in the provision of a four-way valve which is unusually light in weight and compact in nature; whose operation is always balanced and hence conducive to reliability and minimum wear of parts; whose functioning is accomplished by no noisy and undesirable hammering; and which is capable of certain very desirable adjustability during the course of its installation in association with the piston-cylinder arrangement, or the like, with which it is to be used.

One of the features of the present invention lies in the employment of poppet-type valves, with corresponding avoidance of leakage or clogging. In the present construction, four poppet-type valves are arranged in two adjacent pairs, one pair having the valves facing inwardly toward each other, the other pair having the valves facing outwardly away from each other.

A further feature of the invention lies in the employment of a diaphragm for actuating the valves, thereby permitting the use of a relatively small and light actuating solenoid requiring little electrical power.

In accordance with my invention, the diaphragm is arranged and constructed to constitute a wall portion of the valve body, and this contributes toward the present ability to dispense with stuffing boxes entirely.

A further feature of the present invention lies in the arrangement of parts whereby all the valves are always operated simultaneously, and whereby all the parts are in constant engagement, thus producing a construction whose operation is always balanced and devoid of undesirable hammering.

A still further feature of the invention lies in the association with the main valve body of a three-way solenoid-operated pilot valve, mounted in a special and particularly advantageous manner.

Figure 5:
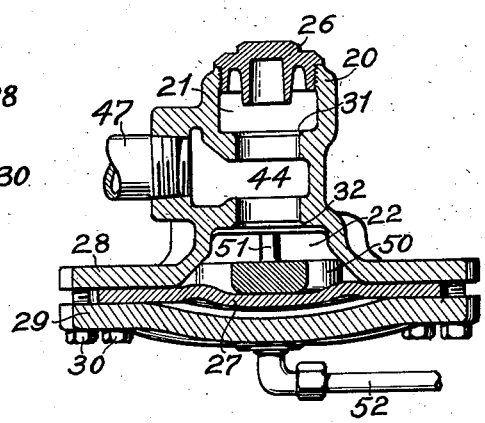
Figure 9:
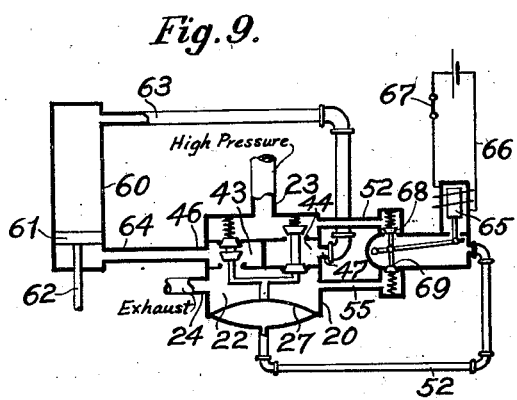
Figure 10:
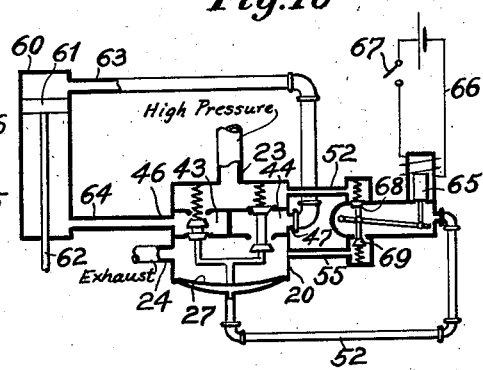
Figure 11:
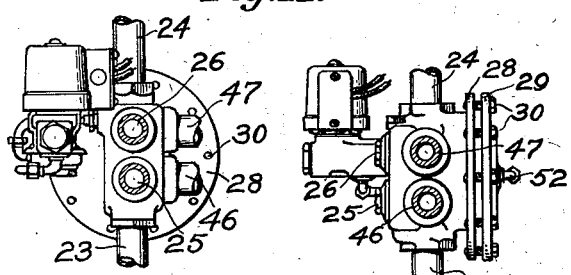
Figure 12:
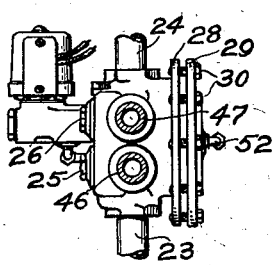

I accomplish the foregoing objects and advantages, and such other objects and advantages as may hereinafter appear or be pointed out, in the manner illustratively shown in the accompanying drawings in which:

Figure 1 is a plan view of a four-way valve constructed in accordance with the present invention, Figure 2 is a front view of the device shown in Figure 1, Figure 3 is a cross-sectional view taken substantially along the lines 3—3 of Figures 1 and 2, Figure 4 is a cross-sectional view taken substantially along the line 4—4 of Figure 3, with certain parts omitted for the sake of clearness, Figure 5 is a cross-sectional view taken substantially along the line 5—5 of Figure 3 with the valves omitted for the sake of clearness, Figure 6 is an enlarged elevational view of one of the poppet type valves by itself, Figure 7 is a cross-sectional view taken substantially along the line 7—7 of Figure 6, Figure 8 is an enlarged cross-sectional view taken substantially along the line 8—8 of Figure 1, Figures 9 and 10 are diagrammatic views illustrating the general mode of functioning of the present valve and pilot arrangement, and Figures 11 and 12 are two elevational views taken at right angles to each other showing the present assembly in an adjusted position.

Referring for the moment to Figure 3, I have shown a substantially rectangular valve body 20 constructed with interior walls and partitions, substantially as shown, to define a substantially L-shaped inlet chamber 21 and a similar L-shaped exhaust chamber 22. In one end wall of the valve body there is a connection nipple or fitting 23 which communicates with the inlet chamber 21; and in the opposite end wall of the valve body a connection nipple or fitting 24 communicates with the exhaust chamber 22.

In the valve body wall which is shown at the top in Figure 3 there are two adjacent access openings which are preferably threaded to receive closure caps 25 and 26.

The opposite wall of the valve body, shown at the bottom of Figure 3, is defined by a flexible diaphragm 27, which may be of rubber or equivalent material, this diaphragm being tightly secured in position, at its periphery, between the plates 28 and 29. The plate 28 is preferably formed as an integral part of the valve body, and the plate 29 is preferably a separate removable member, and these plates are clamped together by threaded studs 30 or the like.

Within the valve body 20 four valve seats are arranged in two adjacent sets. The valve seats of one set are arranged in alignment and face inwardly toward each other. These are shown in the left half of Figure 3. The valve seats of the other set are similarly arranged in alignment and face outwardly with respect to each other. These valve seats are shown most clearly in Figure 5 wherein the reference numeral 31 is applied to one valve seat while the reference numeral 32 is applied to the other. The set of valve seats 31 and 32 is preferably arranged in alignment with the closure cap 26. The other set of valve seats is arranged alongside, preferably in alignment with the closure cap 25.

There is a pair of aligned valves for each set of valve seats. These valves are of the poppet type as illustrated most clearly in Figures 6 and 7. The valve shown in these figures has a tapered seating surface 33, radiating guide fins 34, and valve stem portions 35 and 36 projecting in opposite directions.

The two valves which cooperate with the valve seats 31 and 32 respectively are designated by the reference numerals 37 and 38. They face inwardly toward each other, so that the valve rod portions 36 are in abutment. In this way, this pair of aligned valves is mounted for reciprocation as a unit so that the seating of each valve is accompanied by the unseating of the other. For example, in Figure 3, the valve 37 is seated on the valve seat 31, while the valve 38 is unseated from the valve seat 32. When this unit is moved upwardly (as viewed in Figure 3) the valve 38 will seat against the valve seat 32, and the valve 37 will unseat itself from the valve seat 31.

There is a similar pair of valves for the other set of valve seats, and these valves are designated by the reference numerals 39 and 40. These valves face outwardly so that the valve rod portions 35 are in abutment. Here again, these two valves are mounted for reciprocation as a unit so that the seating of each valve is accompanied by the unseating of the other. For example, in Figure 3, the valve 40 is seated while the valve 39 is unseated. When this unit is moved upwardly (as viewed in Figure 3) the valve 40 will unseat and the valve 39 will seat itself.

For assembly purposes, the valve seat with which the valve 39 cooperates is formed on a separate screw-threaded insert 41 which is set into position after the valves 39 and 40 have been introduced through the access opening which is sealed by the cap 25.

A partition or wall 42 separates the space 43 between the inwardly-facing valve seats from the space 44 between the outwardly-facing valve seats. For a purpose presently to be described the partition 42 is provided with the longitudinal bore 45.

There is a separate connection port for each of the spaces 43 and 44. I have illustratively shown a connection nipple or fitting 46 in the port which communicates with the space 43; and I have shown a similar fitting 47 leading from the space 44. Preferably, these ports or fittings 46 and 47 project from the valve body in a direction at right angles to the inlet and exhaust fittings 23 and 24. Preferably, also, the ports 46 and 47 are parallel to each other, so as to facilitate the matter of connecting them, respectively, with opposite ends of a cylinder whose operation the present valve device is intended to control.

Referring again to Figure 3, it will be observed that I have arranged a compression spring 48 within a recess in the cap 25, this spring engaging around the portion 36 of the valve 39, and serving constantly to press the valve unit 39—40 into the position shown in Figure 3. A similar compression spring 49 is mounted in a recess in the cap 26, and engages the portion 35 of the valve 37, this spring constantly pressing the valve unit 37—38 into the position of Figure 3.

The actuation of the valve units in the opposite direction, i. e., against the actions of the springs 48 and 49, is accomplished by the deflection of the diaphragm 27. Between this diaphragm and the valve units I arrange a plate 50, preferably in the form of a circular disc, this plate having its flat outer surface in constant contact with the inner surface of the diaphragm 27, and having portions of its periphery in constant engagement with the valve units. Thus, the portion of the plate 50 which is toward the left in Figure 3 is in constant engagement with the portion 36 of the valve 40, while the portion of the disc 50 which is toward the right in Figure 3 is in constant engagement with the portion 35 of the valve 38.

Projecting from the midportion of the disc 50 is a guide rod 51 which extends upwardly into the bore 45 in the partition 42.

By means of high pressure fluid introduced to the outer surface of the diaphragm 27 through a conduit 52, the diaphragm may be caused to deflect upwardly, as viewed in Figure 3, and when the pressure on the fluid is released, the springs 48 and 49 return the diaphragm to the position of Figure 3. Preferably, the high pressure fluid which actuates the diaphragm is drawn from the inlet chamber 21 of the valve itself through a port or opening 53. With this object in view, the conduit 52 is caused to extend, in effect, all the way to the port 53. Interposed in this conduit is a three-way solenoid-operated pilot valve which is designated generally by the reference numeral 54, such a unit being known per se. The pilot unit 54 is provided with a conduit 55 which communicates with the exhaust chamber 22 through a port 56.

The function of the unit 54 is to establish connection, selectively, between the diaphragm 27 and the inlet chamber 21 (via the conduit 52), or between the diaphragm 27 and the exhaust chamber 22 (via the conduits 52 and 55).

In Figures 9 and 10 I have diagrammatically illustrated a way in which the present valve works, but it will be understood that these figures are diagrammatic in nature and therefore do not correspond, so far as mechanical construction and arrangement of parts is concerned, with Figures 1–8. For the sake of simplicity, however, the same reference numerals are applied to those parts of Figures 9 and 10 which correspond to parts heretofore designated by such reference numerals.

I have illustratively shown a cylinder 60 within which a piston 61 reciprocates. The piston rod 62 extends to the ultimate device which is to be reciprocated, e. g., a gate valve, a dump cart, or the like. Pipes 63 and 64 connect with opposite ends of the cylinder 60. These pipes are connected respectively to the fittings 46 and 47.

The three-way pilot valve consists essentially of a solenoid 65 energized by an electric circuit 66 in which there is a make-and-break mechanism or switch 67. When the solenoid is energized it opens the valve 68 and closes the valve 69, as shown in Figure 9; and when the solenoid is deenergized it closes the valve 68 and opens the valve 69.

When the switch 67 is closed, as shown in Figure 9, the solenoid 65 is energized. As a result, high pressure fluid enters the inlet chamber of the valve body 20 and passes through the conduit 52 to the diaphragm 27, the latter being thereby deflected to push the valve units into the position shown in Figure 9. In this position of the valves, the high pressure fluid passes through the space 44 into the pipe 63 and forces the piston 61 downwardly. At the same time, the fluid that was behind the piston 61 moves through the pipe 64 into the space 43 and thence into the exhaust chamber 22 and out through the exhaust 24.

When the switch 67 is opened, as shown in in Figure 10, the solenoid 65 is deenergized, thereby closing the valve 68. The fluid behind the diaphragm 27 thereupon flows back through the conduit 52 and through the conduit 55 to the exhaust chamber 22 and out through the exhaust 24. In the meantime, the valve units are pressed downwardly by the springs, whereby the high pressure fluid enters the space 43 and passes through the pipe 64 to the underside of the piston 61. This forces the piston 61 upwardly as shown in Figure 10, and the fluid that was on the upper side of the piston moves through the pipe 63 and through the space 44 into the exhaust chamber 22.

It will be observed that, during all the operations of the valve, the diaphragm 27 is constantly in contact with the valve units, through the intermediary of the disc 50. As a result, there is never any hammering, and the valves move back and forth silently and positively. It will also be observed that the valve units always move simultaneously. This results in balanced operation, and a minimum amount of stress and wear.

Furthermore, the operation of the valve is capable of accomplishment by employing a relatively small and light-weight pilot valve. This results not only in economies, but also permits the pilot valve to be mounted directly on the main valve body. This direct mounting has a further advantage which is illustrated most clearly in Figures 8, 11 and 12.

The port 53 communicates with an enlarged internally threaded portion. A ferrule 70 engages with this opening and presses at its inner end against an enlargement 71 on the inner end of a sleeve 72. This sleeve is internally threaded to receive the adjacent end of the conduit 52.

By means of this arrangement, the solenoid-operated pilot valve may be mounted directly on the valve body 20, without the necessity for any further support. It will be observed that this connection is a pivotal one, and that the axis of the pivot, (i. e., the axis of the union assembly of Figure 8) is parallel to the ports 46 and 47. As a result, the present device may be installed with the diaphragm in a horizontal position (as illustrated in Figures 1–10), or with the diaphragm in a vertical plane, as shown in Figures 11 and 12; and in each case the pilot valve may be retained in the same upright position. This is desirable from the standpoint of operation of the solenoid.

In other words, where the diaphragm is horizontal, the ports 46 and 47 lie side by side in a horizontal plane, and this arrangement is to be preferred where the cylinder 60 happens to be arranged horizontally. In cases where the cylinder 60 happens to be vertically arranged, the present valve may be installed in the position shown in Figures 11 and 12, in which the ports 46 and 47 are arranged one above the other in a vertical plane. Because of the pivotal connection shown in Figure 8, the solenoid may always be retained upright.

In general, it will be understood that changes in the details, herein described and illustrated for the purpose of explaining the nature of my invention, may be made by those skilled in the art without departing from the spirit and scope of the invention as expressed in the appended claims. It is therefore intended that these details be interpreted as illustrative, and not in a limiting sense.

Having thus described my invention, what I claim as new and desire to secure by Letters Patent is—

1. In a four-way valve of the character described, a valve body having an inlet chamber and an exhaust chamber, a set of inwardly-facing aligned valve seats between said inlet and exhaust chambers, a set of outwardly-facing aligned valve seats alongside of the inwardly-facing set, a pair of aligned valves for each of said sets mounted for reciprocation as a unit so that the seating of each valve is accompanied by the unseating of the other, a partition separating the space between the inwardly-facing valve seats from the space between the outwardly-facing valve seats, a separate connection port for each of said spaces, a deflectable diaphragm, said diaphragm being mounted to constitute a wall portion of the valve body, and means actuated by the diaphragm for moving both valve units simultaneously.

2. In a four-way valve of the character described, a valve body having an inlet chamber and an exhaust chamber, a set of inwardly-facing aligned valve seats between said inlet and exhaust chambers, a set of outwardly-facing aligned valve seats alongside of the inwardly-facing set, a pair of aligned valves for each of said sets mounted for reciprocation as a unit so that the seating of each valve is accompanied by the unseating of the other, a partition separating the space between the inwardly-facing valve seats from the space between the outwardly-facing valve seats, a separate connection port for each of said spaces, a deflectable diaphragm, and means actuated by the diaphragm for moving both valve units simultaneously, said means comprising a plate mounted between the diaphragm and said valve units, with portions of the plate in engagement with said valve units, and a guide stem projecting from the midportion of said plate into said partition.

3. In a four-way valve of the character described, a valve body having an inlet chamber and an exhaust chamber, a set of inwardly-facing aligned valve seats between said inlet and exhaust chambers, a set of outwardly-facing aligned valve seats alongside of the inwardly-facing set, a pair of aligned valves for each of said sets mounted for reciprocation as a unit so that the seating of each valve is accompanied by the unseating of the other, each valve unit having a projecting valve stem, a partition separating the space between the inwardly-facing valve seats from the space between the outwardly-facing valve seats, said partition having a bore parallel to the direction of movement of said valve units, a separate connection port for each of said spaces, a deflectable diaphragm, a plate mounted for actuation by said diaphragm and having portions engaging said valve stems, and a guide stem projecting from the midportion of said plate into said bore.

4. In a four-way valve, the combination set forth in claim 1, said diaphragm being mounted to constitute a wall portion of the exhaust chamber of said valve body.

5. In a four-way valve, the combination with the structure set forth in claim 1, of means mounted on the valve body and independent of said valve units for establishing a communication between said inlet chamber and said daphragm to permit deflection of the diaphragm by the fluid medium in said inlet chamber.

6. In a four-way valve of the character described, a valve body having an inlet chamber and an exhaust chamber, a set of inwardly-facing aligned valve seats between said inlet and exhaust chambers, a set of outwardly-facing aligned valve seats alongside of the inwardly-facing set, a pair of aligned valves for each of said sets mounted for reciprocation as a unit so that the seating of each valve is accompanied by the unseating of the other, a partition separating the space between the inwardly-facing valve seats from the space between the outwardly-facing valve seats, a separate connection port for each of said spaces, said ports being parallel to each other, a deflectable diaphragm, means actuated by the diaphragm for moving both valve units simultaneously, and a conduit independent of said valve units establishing a communication between said inlet chamber and said diaphragm, said conduit being pivotally connected to said inlet chamber along an axis parallel to said connection ports.

7. In a four-way valve, the combination with the structure set forth in claim 1, of a three-way pilot valve mounted on the valve body and provided with means for selectively establishing communication between the diaphragm and said inlet and exhaust chambers.

8. In a four-way valve of the character described, a valve body having an inlet chamber and an exhaust chamber, a set of inwardly-facing aligned valve seats between said inlet and exhaust chambers, a set of outwardly-facing aligned valve seats alongside of the inwardly-facing set, a pair of aligned valves for each of said sets mounted for reciprocation as a unit so that the seating of each valve is accompanied by the unseating of the other, a partition separating the space between the inwardly-facing valve seats from the space between the outwardly-facing valve seats, a separate connection port for each of said spaces, said ports being parallel to each other, a deflectable diaphragm, means actuated by the diaphragm for moving both valve units simultaneously, and a three-way pilot valve pivotally mounted on the valve body and provided with means for selectively establishing communication between the diaphragm and said inlet and exhaust chambers, the axis of said pivotal mounting being parallel to said connection ports.

GEORGE STUMPF.